(12) United States Patent
Raimund (10) Patent No.: US 11,828,271 B2
(45) Date of Patent: Nov. 28, 2023

(54) UTILIZATION OF A COMPOSITE NACELLE COVER AS THE LOAD-CARRYING STRUCTURE FOR MAIN MACHINERY COMPONENTS FOR A WIND TURBINE

(71) Applicant: Jupiter Bach A/S, Køge (DK)

(72) Inventor: Ulrik Raimund, Bogø By (DK)

(73) Assignee: Jupiter Bach A/S, Koge (DK)

( * ) Notice: Subject to any disclaimer, the term of this patent is extended or adjusted under 35 U.S.C. 154(b) by 0 days.

(21) Appl. No.: 17/776,003

(22) PCT Filed: Nov. 13, 2020

(86) PCT No.: PCT/EP2020/082105
§ 371 (c)(1),
(2) Date: May 11, 2022

(87) PCT Pub. No.: WO2021/094565
PCT Pub. Date: May 20, 2021

(65) Prior Publication Data
US 2022/0389914 A1 Dec. 8, 2022

(30) Foreign Application Priority Data

Nov. 15, 2019 (DK) .............................. PA201970699

(51) Int. Cl.
*F03D 80/80* (2016.01)
*F03D 13/20* (2016.01)

(52) U.S. Cl.
CPC ............. *F03D 80/88* (2016.05); *F03D 13/20* (2016.05)

(58) Field of Classification Search
CPC .......... F03D 80/88; F03D 13/20; F03D 80/82; F03D 80/80; F05B 2240/14; Y02B 10/30; Y02E 10/72
See application file for complete search history.

(56) References Cited

U.S. PATENT DOCUMENTS

| | | | |
|---|---|---|---|
| 2005/0230979 A1* | 10/2005 | Bywaters | F03D 9/25 290/44 |
| 2010/0007149 A1* | 1/2010 | Willey | F03D 80/00 290/55 |
| 2010/0301604 A1* | 12/2010 | Nielsen | F03D 7/0204 290/44 |

(Continued)

FOREIGN PATENT DOCUMENTS

| | | |
|---|---|---|
| EP | 2143945 A2 | 1/2010 |
| EP | 2795108 A2 | 10/2014 |

OTHER PUBLICATIONS

International Preliminary Report on Patentability in related international application No. PCT/EP2020/082105 dated May 17, 2022.

(Continued)

*Primary Examiner* — Aaron R Eastman
(74) *Attorney, Agent, or Firm* — Polsinelli, P.C.

(57) ABSTRACT

A composite nacelle cover (1;22) equipped with main machinery components (9a;9b;10) for a wind turbine has a composite wall (3,4,5,6,7) constituting a first load-carrying structure for at least one component of a first part (9a;9b) of the main machinery components. The length of the conventional load-carrying frame can be reduced and a lot of weight of the overall nacelle structure be eliminated.

20 Claims, 3 Drawing Sheets

(56) References Cited

U.S. PATENT DOCUMENTS

| | | | | |
|---|---|---|---|---|
| 2010/0301605 | A1* | 12/2010 | Nielsen | F03D 7/0224 |
| | | | | 290/44 |
| 2010/0314884 | A1* | 12/2010 | Ollgaard | F03D 13/20 |
| | | | | 290/55 |
| 2015/0007693 | A1* | 1/2015 | Trede | F03D 80/70 |
| | | | | 74/606 R |
| 2015/0016976 | A1* | 1/2015 | Roer | F03D 15/20 |
| | | | | 415/182.1 |
| 2016/0076522 | A1* | 3/2016 | Rohden | F03D 80/60 |
| | | | | 416/9 |
| 2019/0203700 | A1* | 7/2019 | Numajiri | B66C 23/185 |
| 2020/0018292 | A1* | 1/2020 | Taubenrauch | F03D 80/00 |
| 2020/0130298 | A1* | 4/2020 | Lindeskov | B64D 29/00 |
| 2023/0160797 | A1* | 5/2023 | Attanasio | G01M 5/0016 |
| | | | | 73/812 |

OTHER PUBLICATIONS

International Search Report and Written Opinion in related international application No. PCT/EP2020/082105 dated Feb. 22, 2021.

* cited by examiner

UTILIZATION OF A COMPOSITE NACELLE COVER AS THE LOAD-CARRYING STRUCTURE FOR MAIN MACHINERY COMPONENTS FOR A WIND TURBINE

FIELD OF THE INVENTION

The present invention relates to a composite nacelle cover carrying main machinery components for a wind turbine.

BACKGROUND

A wind turbine converts the kinetic energy in the wind into mechanical power by means of a rotor coupled to main machinery components. Wind turbines comes in various sizes ranging from small wind turbines to very large turbines, the majority of which are large three-bladed horizontal-axis wind turbines (HAWT). The large wind turbines are high and have a very large numbers of main machinery component groups and subcomponents installed on a frame inside the nacelle cover. Wind turbines from different manufacturers have different frames and arrangements of machinery to fit inside the various designs of composite nacelle cover, which designs have an impact on the arrangement of the machinery as well.

One of the largest components located inside the nacelle cover of a wind turbine is the load-carrying frame, which is also known to be one of the most critical components of the wind turbine. The load-carrying frame typically consists of a rear frame part, a front frame part, and optionally a generator frame part, which frame parts are installed in the nacelle cover to carry and support many of the components and machinery that transform the wind's kinetic energy conferred to the rotor into mechanical energy to turn a generator that produces electric power. The components and machinery are hitherto installed on the load-carrying frame, which is then lifted into the nacelle cover, secured to the nacelle cover and aligned with the rotor to be put in operative condition to gain electric power. The front frame part and the optional general frame part may be referred to as the bed plate frame and the rear frame part may be referred to as the main frame.

The load-carrying frame is typically a cast steel frame or a steel frame bolted together, and thus very heavy, and expensive to manufacture. Moreover, said load-carrying frame must be subjected to expensive quality controls and non-destructive testings. The load-carrying frame are also expensive, strenuous, and time-consuming to transport to the erection site, as well as to lift into the nacelle cover with the components and machinery supported on the load-carrying frame, as dealt with in U.S. Pat. No. 7,793,964 B2 and European patent application no. EP 3 246 561 A1, respectively.

In a typical wind turbine, the hub is secured to the front of the nacelle cover with the blades directly bolted to the hub, or bolted to the hub via a pitch bearing. The yaw system, main-shaft bearing, gearbox, generator, transformer and electrical control cabinets are behind the hub and conventionally mounted on the front frame of the nacelle.

The load-carrying frame can e.g. be made as two heavy main cast and/or welded steel parts, wherein e.g. the yaw system, main shaft, and optionally the gearbox, are secured to the front frame part, and the transformer, and electrical cabinets are secured to the rear frame part. The generator can conventionally be secured to any of the front frame part and the rear frame part. Once the yaw system passes its rotational test and its motors are installed and pass their functional tests, the front frame part and rear frame part are joined by heavy bolts. The entire load-carrying frame assembly with its machinery and other components is then attached by brackets to the walls of the fiber-reinforced composite nacelle cover.

European patent application no. EP 2 322 795 A2 describes an example of a load-carrying frame installed in a nacelle cover. A load-carrying frame is thus disposed within the nacelle cover to carry and support the main machinery components of the wind turbine using a plurality of brackets mounted at an upper and a lower portion of the load-carrying frame to secure the load-carrying frame to the nacelle inner.

The wind industry is always in demand of ways to reduce productions costs and to improve the ways a wind turbine is produced, so it is a main aspect of the present invention to reduce productions costs of a wind turbine.

SUMMARY OF THE INVENTION

In yet an aspect is provided a wind turbine, for which the amount of steel for manufacturing the load-carrying frame can be reduced, In yet an aspect is provided a nacelle having a substantially smaller, typically substantially shorter load-carrying frame than the interior length of the composite nacelle cover.

In yet an aspect is provided a nacelle, which is less heavy than hitherto known.

The present invention, in one aspect, provides a wind turbine nacelle, the nacelle comprising a composite nacelle cover delimiting an interior space accommodating a plurality of main machinery components of the wind turbine, wherein the plurality of main machinery components are serially arranged in a length direction which extends from a nacelle front end to a nacelle rear end, the nacelle front end being closest to a rotor of the wind turbine and the nacelle rear end being farthest from the rotor, and the serially arranged plurality of main machinery components comprise a first part of the main machinery components and a second part of the main machinery components, wherein the nacelle further comprises a load-carrying frame having a frame front end and a frame rear end, wherein the length of the load-carrying frame from the frame front end to the frame rear end is shorter than the length of the serially arranged main machinery components along the length direction, wherein the second part of the main machinery components is supported on the load-carrying frame and the first part of the main machinery components is secured to a composite wall of the composite nacelle cover, the composite wall constituting a first load-carrying structure for the first part of the main machinery components.

The present invention, in another aspect, provides a wind turbine nacelle, the nacelle comprising a composite nacelle cover delimiting an interior space accommodating a plurality of main machinery components of the wind turbine, the plurality of main machinery components comprising a first part of the main machinery components and a second part of the main machinery components, the nacelle having a nacelle front end and a nacelle rear end which is spaced from the nacelle front end along a length direction of the nacelle, the nacelle front end being closest to a rotor of the wind turbine and the nacelle rear end being farthest from the rotor, wherein the nacelle further comprises a load-carrying frame, the load-carrying frame having a frame front end and a frame rear end, wherein the frame rear end is within the interior space and is spaced inwardly from the nacelle rear end along the length direction, wherein the first part of the main machinery components is secured to a composite wall of the composite nacelle cover at a position, along a length direction of the nacelle, which is rearward of the frame rear end and between the frame rear end and the nacelle rear end, the composite wall constituting a first load-carrying structure for the first part of the main machinery components, and the second part of the main machinery components is supported on the load-carrying frame constituting a second load-carrying structure for the second part of the main machinery components.

In a preferred embodiment of the present invention, the first part of the main machinery components is unsupported by the load-carrying frame.

In a preferred embodiment of the present invention, the first part of the main machinery components is secured to the composite wall of the composite nacelle cover at a position which is rearward of the frame rear end.

In a preferred embodiment of the present invention, the load-carrying frame comprises a bed plate frame having an upper side which supports a drive train which is connected to the rotor, and a lower side which is connected to a yaw bearing between the nacelle and a tower of the wind turbine.

The load-carrying frame may optionally consist of the bed plate frame.

Alternatively, the load-carrying frame may optionally further comprise a main frame which extends rearwardly from the bed plate frame. Optionally, the main frame comprises the frame rear end which is located at a position, rearward of the nacelle front end, which is within the range of from 25 to 75% along the length of the nacelle cover from the nacelle front end. Further optionally, the frame rear end is located at a position, rearward of the nacelle front end which is about two thirds along the length of the nacelle cover from the nacelle front end.

Preferably, the bed plate frame comprises a hole which is aligned with a bottom hole in the composite nacelle cover.

In any of the preferred embodiments of the present invention, the composite nacelle cover is fitted to the bed plate frame, and bed plate frame connects the composite nacelle cover to the tower.

In any of the preferred embodiments of the present invention, the bed plate frame constitutes a load-carrying structure for the composite nacelle cover and the first part of the main machinery components secured to the composite nacelle cover.

In any of the preferred embodiments of the present invention, the composite nacelle cover is self-supporting. Accordingly, the composite nacelle cover not only supports its own weight, but also supports the weight of any machinery component secured thereto.

In a particularly preferred embodiment, the fitting of the composite nacelle cover to the bed plate frame constitutes the sole external structural support for the composite nacelle cover.

In a preferred embodiment of the present invention, the first part of the main machinery components is located between the frame rear end and the nacelle rear end.

In a preferred embodiment of the present invention, the composite nacelle cover is a fiber-reinforced composite nacelle cover having opposite plastic face skins laminating a foam core.

In a preferred embodiment of the present invention, the first part of the main machinery components is secured directly to the composite wall of the composite nacelle cover by means of brackets and bolts. Typically, the first part of the main machinery components is suspended from sidewalls of the composite nacelle cover.

In a preferred embodiment of the present invention, the second part of the main machinery components comprises a drive train of the wind turbine. Typically, the drive train of the wind turbine includes a main shaft connected to the rotor, shaft bearings, and a generator. Optionally, the drive train of the wind turbine further includes a gearbox between the main shaft, as a low speed shaft, and an output shaft, as a high speed shaft, connected to the generator.

In a preferred embodiment of the present invention, the first part of the main machinery components secured to the first load-carrying structure comprises, or is, a transformer. Typically, the first part of the main machinery components secured to the first load-carrying structure further comprises one or more electrical control cabinet(s).

In a preferred embodiment of the present invention, the composite nacelle cover has substantially flat and straight walls.

The present invention also provides a windmill comprising a tower and a wind turbine nacelle according to the present invention at a top of the tower.

Typically, a bed plate frame connects the composite nacelle cover to the tower.

The novel and unique features whereby these and other aspects are achieved according to the preferred embodiments of the present invention consist in that the composite nacelle cover has a composite wall constituting a first load-carrying structure for at least one component of a first part of main machinery components of the wind turbine, preferably for several components of the first part of main machinery components, and preferably all components of the first part of main machinery components.

Thus in the preferred embodiments of the present invention at least some of the machinery and operative components of the wind turbine that converts the kinetic energy of the wind into electrical power are installed inside the composite nacelle cover by being secured directly to the composite wall of the composite nacelle cover, e.g. by means of brackets and bolts, without said first part of main machinery components are supported on a load-carrying frame. Instead such first part of main machinery components can be secured directly to the composite wall of the composite nacelle cover at selected securing points and locations. In other words, the composite nacelle cover has at least one main machinery component secured to the composite wall of said composite nacelle cover instead of to a load-carrying frame.

Within the scope of the present invention the term "nacelle cover" is understood to mean the part of the wind turbine that houses the main machinery, and to which the rotor are mounted at a front end. Typically the composite nacelle cover has a bottom hole that is aligned with a hole in a bed plate at the top of the tower.

Within the scope of the present invention the term "composite" means a made from two or more constituent materials with significantly different physical or chemical properties that, when combined, produce a material with characteristics different from the individual components. The "composite" preferably include a polymer matrix reinforced with fibers. Fibre-reinforced polymers may be thermosettings, e.g. carbon-fibre-reinforced polymer (CFRP) and glass-reinforced plastic (GRP). The plastic composite may be used in a laminate having a core, such a foam core, e.g. a polyurethane foam core of a honeycomb structure, sandwiched between opposite composite face skins, thereby providing thickness and structural strength to the laminate, and thus to a wall of a composite nacelle cover made of such laminate.

Within the scope of the present invention the term "bed plate" or "bed plate frame" means the transition piece of the load-carrying frame located inside the composite nacelle cover and connecting the main bearing(s), the shafts, the generator, and optionally the gearbox if present, towards the rotor at one side, and the yaw bearing towards the tower on the other side. The terms "bedplate" and "bed plate frame" are used interchangeably in the following description.

Within the scope of the present invention the term "main machinery components", "main components", and "machinery" are used interchangeably for the components including but not limited to the main support, yaw system, brakes, cooling system, transformer, computer, electrical control cabinets, and the drive train including the low-speed shaft (main shaft), the gearbox, the high-speed shaft, shaft bearings, and the generator.

By securing some of the main machinery components to the composite wall of the composite nacelle cover, e.g. to the floor and/or sides of the composite nacelle cover, instead of to a load-carrying frame, a lot of heavy steel for manufacturing said load-carrying frame can be dispensed with, as well as costs and many man-hours for testing the conventionally long load-carrying frame can be saved.

Some manufactures may however choose to still use a part of a load-carrying frame for supporting at least one component of a second part of the main machinery components of the wind turbine, which part of the load-carrying frame may constitutes a second load-carrying structure for the main machinery components not being secured to the composite wall of the composite nacelle cover. It is however preferred to support as few components of the second part of the main machinery components as possible on the load-carrying frame, and instead utilize the composite nacelle cover wall as the load-carrying structure.

The composite nacelle cover can be a fiber-reinforced composite nacelle cover, preferably a fiber-reinforced composite nacelle cover having opposite plastic face skins laminating a foam core. The fiber-reinforced composite may e.g. be glass fibers/epoxy matrix composites, natural composites, hybrid and nanoengineered composites, and e.g. any of the composites described in the article "*Materials for Wind Turbine Blades: An Overview*", by Leon Mishnaevsky, Jr., Kim Branner, Helga Nørgaard Petersen, Justine Beauson, Malcolm McGugan, and Bent F. Sorensen published in Materials Oct. 13, 2017. Fiber reinforcement increases the strength of the plastic by acting as a stress dissipater. When the plastic, the polymer, is subjected to stress forces the energy is transferred to the stronger reinforcing fibers embedded within the plastic matrix. The fibers transmit the stress over a wider physical area or throughout the entire plastic skin.

Metal nacelle covers are explicitly excluded, and do not form part of the present invention. Drilling holes for brackets for securing of main machinery components in a metal nacelle wall provides a basis and a path for rust formations and corrosive attack due to humid always present in the surroundings. Expensive precautionary provisions, actions and processes are required to avoid these consequences, such as additional post processes, such as painting and frequent shifting of many bolts and brackets, as well as extra surveillance to observe consequences early. Thus metal nacelle covers are not appropriate for the present invention.

The part of the load-carrying frame that constitutes the second load-carrying structure can be at least a part of a front frame of the main frame, or be the entire front frame, thus the entire bed plate, in which cases the second part of the main machinery components may include machinery components selected from the group comprising one or more machinery components of the drive train, optionally also the yaw system or a part of the yaw system. Thus even the length of the front frame can be reduced compared to conventional front frames, and still provide sufficiently safe and strong support, as just a part of the entire load-carrying structure, still keeping e.g. the drive train properly aligned.

Emphasize is added that for some composite nacelle covers no rear frame is needed at all, optionally no front frame will be needed either, in that the wall of the composite nacelle cover may be the sole load-carrying structure.

The composite nacelle cover described in the applicant's own International patent application no. WO2019/034214 is particular suited for use as load-carrying structure for the main machinery components. This only composite nacelle cover can accommodate a reduced size load-carrying frame or no load-carrying frame at all.

International patent application no. WO2019/034214 describes a scalable modular nacelle assembly structure comprised of standard size panel sub-elements of fiber-reinforced composite laminate. These standard size panel sub-elements are preferably sections cut from elongate composite laminate sheet panels having coupling profiles to join to similarly obtained adjacent panel sub-elements, e.g. joined side by side. The panel sub-elements can in the alternative be molded as individual subcomponents. The surrounding wall of the fiber-reinforced composite nacelle is assembled without using a supporting framework or skeleton for securing and supporting the panel sub-elements. The applicant can establish by way of calculations, and tests will confirm, that a modular nacelle assembly structure assembled of standard panel sub-elements of fiber-reinforced composite laminate as defined in International patent application no. WO2019/034214 is strong, and optimal useful, as the load-carrying structure for at least a part, and preferably at least the majority, of all of the main machinery components, at no risk that the machinery components displace or disengage the composite wall even under heavy external forces, or without the need for the increased maintenance mentioned for the metal nacelle cover. The overlapping coupling profiles of the modular nacelle assembly structure described in International patent application no. WO2019/034214 defines zones of very high structural strength and integrity that allows the wall of said nacelle assembly structure itself to constitute the support surface and load-carrying structure for securing main machinery components of the wind turbine without using a load-carrying frame, or just using a part of the conventional load-carrying frame. The composite nacelle cover and the manufacturing method of panel sub-elements of International patent application no. WO2019/034214 is incorporated in full in the present application.

Emphasis is made that the present invention is not limited to be used with just the composite nacelle cover described in the applicant's own International patent application no. WO2019/034214. Within the scope of the present invention main machinery components can be implemented in a multiplicity of other kinds of composite nacelle covers without using a load-carrying frame, or just using a part of the total length of the normally used load-carrying frame for said composite nacelle cover. The present invention is suited for both complex and simple composite nacelle cover designs. The present invention may reduce the overall length of the nacelle, and the nacelle may in the long view be made shorter due to the invention offers a better utilization of the interior space of the composite nacelle cover. This way the invention may save even further productions costs for the wind energy industry.

In an initial embodiment the first part of main machinery components being secured to the first load-carrying structure may be one or more of the transformer, the computer and/or the electrical control cabinet(s).

A first part of main machinery components can be lifted separately and fast into the nacelle hollow as individual main machinery component(s), which process of course is less heavy and complicated than when lifting the combined installation of all main machinery components on a load-carrying frame. Once inside the composite nacelle cover each component of the first part of main machinery components can subsequently be secured to the wall of the composite nacelle cover. The second part of the main machinery components of the wind turbine that might remain secured to at least a part of the load-carrying frame can be lifted in conventional manner inside the composite nacelle cover, but this assembled structure is still much less heavy and easier to lift than if a fully equipped load-carrying frame is lifted. In conventional wind turbines all parts of main machinery components are lifted in common on a load-carrying frame, which put a high demand on the ways the parts must be secured to the load-carrying frame in order not to displace to any extent at all in relation to each other, or drop off the load-carrying frame during lifting. When fewer parts of main machinery need to be lifted in common the lifting process is less vulnerable to failure and wind influences. A separate component of the first part of main machinery components only needs to be secured to the load-carrying composite nacelle cover wall at few points.

The invention also provides freedom to install individual components on other positions inside the composite nacelle cover than previously defined and dictated by the conventional load-carrying frame composed of both a bed plate frame and a main frame. Thus the interior positioning arrangement of main machinery components, and the design of said arrangement, can, provided the mechanical interaction of main machinery components allow it and is not affected or destroyed, be customized and targeted for each customer and each nacelle design, and easily changed if the demand and possibility arises.

The size of the load-carrying frame can, when used in a composite nacelle cover, be reduced substantially compared to conventional configurations of load-carrying steel frames for conventionally known wind turbine machinery, this way saving a lot of weight. Thus reducing the size, in particular the length, of the load-carrying frame, e.g. by elimination of the main frame, does not only save amounts of steel, the transport costs are also reduced, as well as lifting costs, testing costs, and work time costs. Furthermore, utilization of the interior space of the composite nacelle cover can be optimized and utilized the best possible way.

In case a load-carrying frame is provided in the composite nacelle cover it is preferred that the length of the load-carrying frame from a nacelle front end towards a nacelle rear end is shorter than the length of plural serially arranged main machinery components, wherein the nacelle front end is closest to the rotor and the nacelle rear end is farthest from the rotor.

The load-carrying frame of the composite nacelle cover of the present invention may in accordance with the present invention have a front frame part (a bed plate frame), and only a part of a rear frame part (main frame).

In the alternative the load-carrying frame has no rear frame part at all and the machinery components normally secured to the rear frame part are secured directly to the wall of the composite nacelle cover.

The front frame part can be a steel structure or be manufactured of fiber-reinforced composite.

In a preferred embodiments a main machinery component that is not supported onto a load-carrying frame part as the load-carrying structure can simply be secured directly to the wall of the composite nacelle cover by means of securing means, such as bolts and brackets, and preferably secured at wall points being predetermined by calculations based on models and tests to be particular strong securing points. Thus securing main machinery components to the wall of the composite nacelle cover provides options for securing said main machinery component.

A 3-Dimensional structure of composite nacelle cover that is especially for carrying the load of the machinery components may have substantially flat and straight walls, thus walls without any substantially curving. Optionally such a composite nacelle cover may have a substantially rectangular appearance with a substantially square cross-section.

The present invention also relates to a wind turbine comprising a tower and a nacelle at the top of the tower. The wind turbine comprises the composite nacelle cover described above and being equipped with main machinery components secured to the wall of the composite nacelle cover without using a load-carrying frame, including not using one or more of a part of a front frame, a part of a rear frame, the entire front frame, and/or the entire rear frame thereby substantially reducing overall weight of the nacelle and making the installation of the first part of main machinery components fast and easy. The composite nacelle cover may be secured directly to the top of the tower.

As an example within the scope of the present invention it is intended to reduce the length of the conventional load-carrying frame by about one third. For a main frame weighing about 25 tons about 7 tons of steel and about 300 bolts may be saved.

BRIEF DESCRIPTION OF THE DRAWINGS

The invention will now be described by way of example with references to the accompanying drawing, in which.

DETAILED DESCRIPTION

In the FIGS. 1-7 a longitudinal side wall of the composite nacelle cover has been left out only for illustrative purposes. Emphasis is also added that in the figures the components of the first part of the main machinery components are only shown schematically as examples and that the second part of the main machinery components are left out. Furthermore no bolts or bracket are shown as the securing means in the figures. It is however emphasized that such securing means are present. The composite nacelle cover shown in figures is embodiments of composite nacelle cover in accordance with the applicant's International patent application no. WO2019/034214. Other designs of composite nacelle covers are within the scope of the present invention and the example shown in the figures is not exhaustive of the models and embodiments of composite nacelle covers that can implement and utilize the present invention. Also the designs of load-carrying frames shown in the figures are only examples, and load-carrying frames of multiple designs can be reduced in size, or be manufactured with reduced size for the purpose of the present invention.

When a main machinery components, whether it being the first part, the second part or both said parts, is secured to a side wall of the composite nacelle cover this should not be construed as limiting the scope of the present invention. Such a component could quite as well be secured to the floor, end walls, or even to the roof, although not to the hatch.

Figure 1:
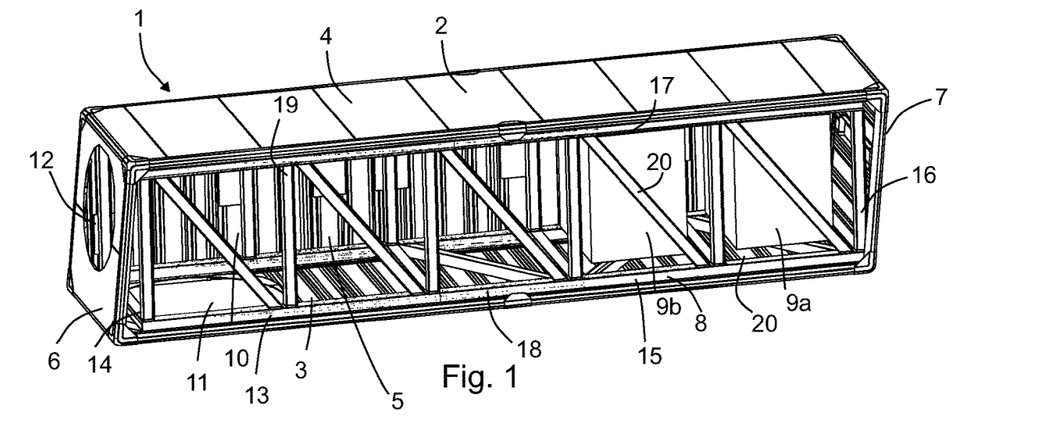
FIG. 1 is a principle sketch in a perspective side view of a conventional embodiment of a composite nacelle cover provided with a first embodiment of a load-carrying frame.

The first embodiment of a composite nacelle cover 1 shown in FIG. 1 is a first embodiment of a composite nacelle cover in accordance with the applicant's International patent application no. WO2019/034214 assembled of plural panel-sub-elements 2 of fiber-reinforced composite laminate, wherein opposite plastic face skins laminates a foam core. The plural panel-sub-elements 2 of fiber-reinforced composite laminate are assembled into flat walls, and thus better suited for suspending of machinery components, or any other items, than curved walls.

The composite nacelle cover 1 thus has six flat walls: a floor 3, a roof 4, opposite flat sidewalls 5, an inclined front end wall 6, which forms the nacelle front end, and an inclined rear end wall 6, which forms the nacelle rear end, which walls delimit an interior space 7 for accommodating a conventional first embodiment of a load-carrying frame 8 supporting a first part 9a;9b of the main machinery components and a second part of the main machinery components (not shown, but the general position is indicated by reference numeral 10).

The floor 3 has a bottom hole 11 for securing the composite nacelle cover 1 in accessible communication with the tower (not shown) of the wind turbine (not shown) to provide access to the nacelle inner from the tower. The yaw system (not shown) of the wind turbine is located in the vicinity of the bottom hole 11. The inclined front end wall 6 has a front hole 12 for securing the rotor (not shown).

The load-carrying frame 8 has a front frame part 13 terminating in a frame front end 14 and an opposite rear frame part 15 terminating in a frame rear end 16. The load-carrying frame 8 is a steel framework 17 of very simple design, in that the steel framework 17 is in the form of a latticework composed of horizontal steel beams 18 and vertical steel beams 19 defining rows of squares 20 along the walls 3,4,5,6 of the composite nacelle cover 1, some of which squares 20 have yet a diagonal steel beam 21 for further structural reinforcement. The load-carrying frame 8 rests on the floor 3 and is secured at appropriate securing points to any of the walls 3,4,5,6 of the composite nacelle cover 1 using bolts (not shown) and brackets (not shown).

The first part 9a;9b of the main machinery components are illustrated as square boxes, but can typically be a transformer 9b and an electrical cabinet 9a.

The first embodiment of a load-carrying frame 8 has no well-defined distinction between the front frame part 13 and the rear frame part 15 that specifically serves as a distinct bed plate frame and main frame, respectively.

The length of the first embodiment of a load-carrying frame 8 is easily modified within the scope of the present invention.

Figure 2:
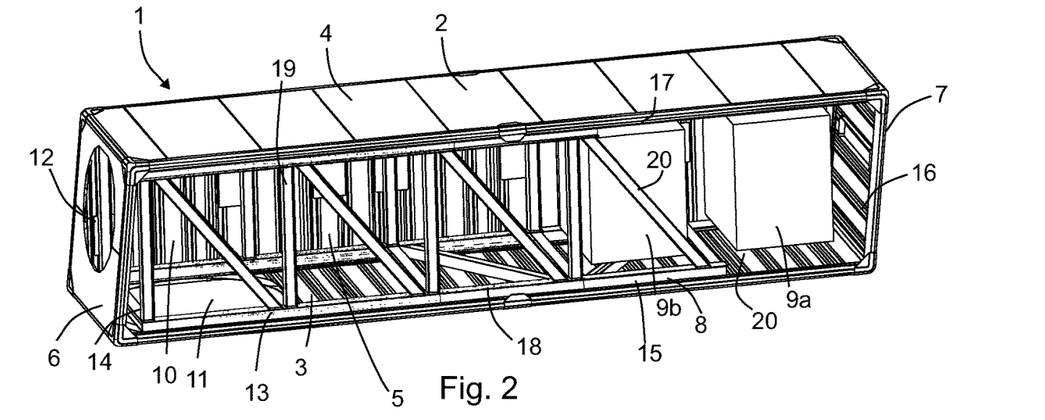
FIG. 2 shows the same modified in accordance with the present invention.

In the first modification of the first embodiment of a load-carrying frame 8 seen in FIG. 2, a fifth of the length of the load-carrying frame 8 seen in FIG. 1 has been eliminated and one machinery component 9a of the first part 9a;9b of machinery components has been secured to the side wall 5 or to the floor 3 instead of to a load-carrying frame 8. The rear frame part 15 has been partly removed.

Figure 3:
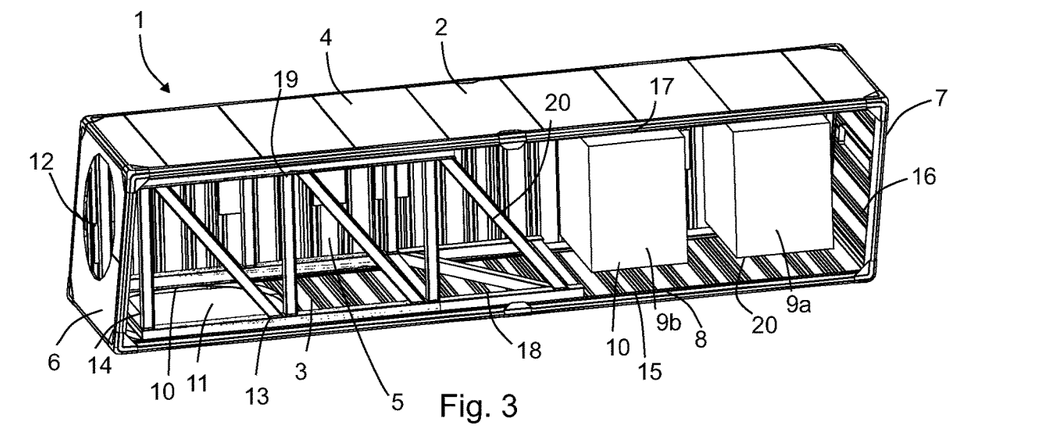
FIG. 3 shows the same even further modified in accordance with the present invention.

In the second modification of the first embodiment of a load-carrying frame 8 seen in FIG. 3, two fifth of the length of the load-carrying frame 8 seen in FIG. 1 has been eliminated and both machinery components 9a;9b of the first part 9a;9b of machinery components are now secured to the side wall 5 or to the floor 3 instead of to a load-carrying frame 8. The rear frame part 15 has been fully removed. The side wall 5 or the floor 3 of the composite nacelle cover 1 now serves as the load-carrying structure and two fifths of the metal for the load-carrying frame have been saved.

The nacelle cover 22 shown in FIGS. 4-7 is a second embodiment of a composite nacelle cover 1 in accordance with the applicant's International patent application no. WO2019/034214. The second embodiment of a nacelle cover 22 is substantially identical to first embodiment of a nacelle cover 1 seen in FIGS. 1-3 and for like parts same reference numerals are used.

Figure 4:
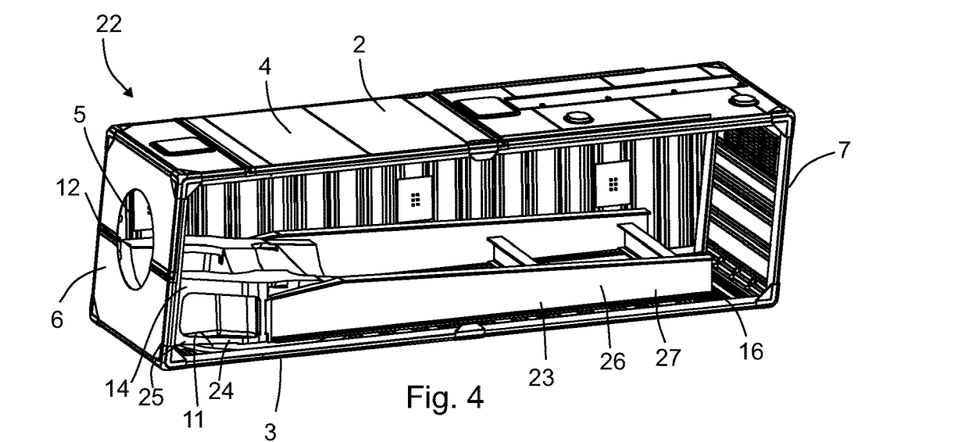
FIG. 4 is a principle sketch in a perspective side view of another conventional embodiment of a composite nacelle cover provided with a second embodiment of a load-carrying frame.

The second embodiment of a composite nacelle cover 22 accommodates a second embodiment of a load-carrying frame 23 that has a front frame part 24 in form of a bed plate frame 25 to support the drive train (not shown), and an opposite rear frame part 26 in form of a main frame 27. The shown second embodiment of a load-carrying frame 23 is known in the art.

In a preferred embodiment of the present invention, the load-carrying frame 23 comprises the bed plate frame 25 which has an upper side which supports the drive train (not shown) which is connected to the rotor (not shown), and a lower side which is connected to a yaw bearing (not shown) between the nacelle and the tower of the wind turbine.

Figure 5:
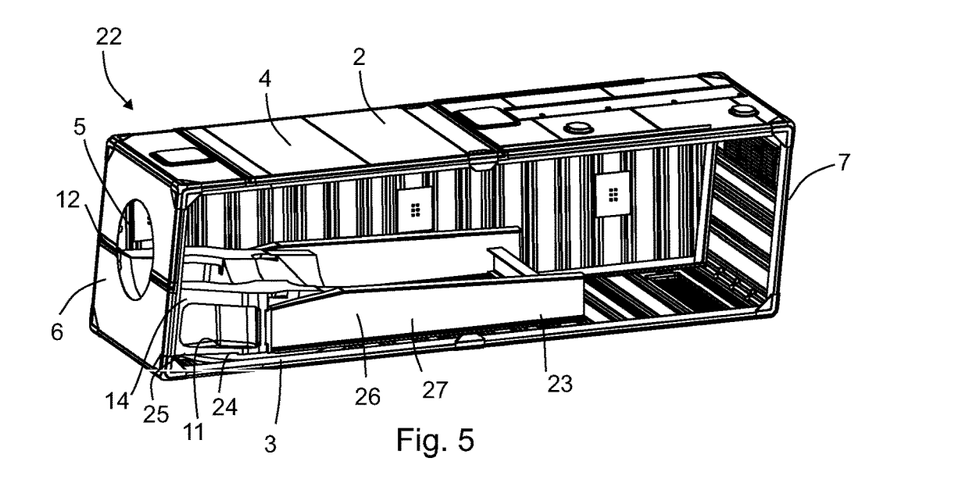
FIG. 5 shows the same modified in accordance with the present invention.

In the first modification of the second embodiment of a load-carrying frame 23 seen in FIG. 5, about a third of the length of the main frame 27 seen in FIG. 4 has been eliminated to allow machinery components of the first part of machinery components to be secured to the wall of the composite nacelle cover 22 instead of to the main frame 27. The first part of the main machinery components is unsupported by the load-carrying frame and is secured to the composite wall of the composite nacelle cover 1 at a position which is rearward of the frame rear end 16. The first part of the main machinery components is located between the frame rear end 16 and the nacelle rear end.

Optionally, the main frame 27 comprises the frame rear end 16 which is located at a position, rearward of the nacelle front end, which is within the range of from 25 to 75% along the length of the nacelle cover 1 from the nacelle front end. Further optionally, the frame rear end 16 is located at a position, rearward of the nacelle front end, which is about two thirds along the length of the nacelle cover 1 from the nacelle front end.

Figure 6:
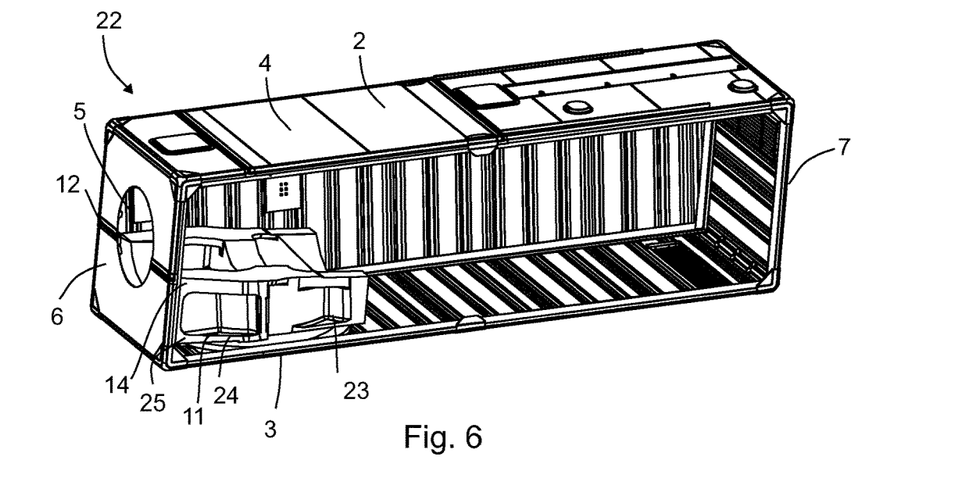
FIG. 6 shows the same even further modified in accordance with the present invention.

In the second modification of the second embodiment of a load-carrying frame 23 seen in FIG. 6, the main frame 27 seen in FIG. 4 has been eliminated in its entirety leaving only the bed plate frame 25, which is intended to support the second part of the main machinery components of the wind turbine. Both the drive train and the generator can be supported on the load-carrying bed plate frame 25. In this embodiment therefore, the load-carrying frame 23 may consist of the bed plate frame 25.

Figure 7:
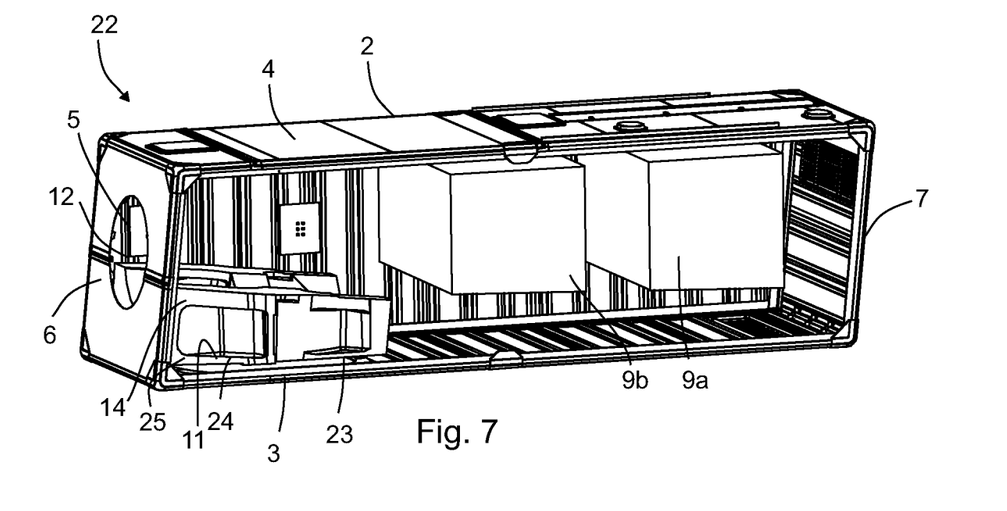
FIG. 7 shows the embodiment of FIG. 6 with two components of the first part of the main machinery components secured to the wall of the composite nacelle cover, and not to the load-carrying frame.

However as seen in FIG. 7 the first part 9a;9b of the main machinery components are suspended to the side wall 5 of the nacelle cover 22 eliminating the function and use of the main frame 27. A main frame 27 conventionally takes up space and this space can either be used for supporting other equipment of machinery, but the length of the nacelle cover can also be shortened. A lot of weight of the overall nacelle structure is also eliminated. In this embodiment therefore, again the first part of the main machinery components is unsupported by the load-carrying frame 23 and is secured to the composite wall of the composite nacelle cover 1 at a position which is rearward of the frame rear end 16. The first part of the main machinery components is located between the frame rear end 16 and the nacelle rear end.

The generator (not shown) may in the alternative be placed directly on the floor 3 of the composite nacelle covers 1;22 instead of the being supported by a load-carrying frame 8;23.

In the second embodiment illustrated in FIGS. 5 to 7, it is preferred that the composite nacelle cover is fitted to the bed plate frame, and bed plate frame connects the composite nacelle cover to the tower. The bed plate frame therefore can constitute a load-carrying structure for the composite nacelle cover and the first part of the main machinery components secured to the composite nacelle cover. Preferably, the composite nacelle cover is self-supporting. Accordingly, the composite nacelle cover not only supports its own weight, but also supports the weight of any machinery component secured thereto. In a particularly preferred embodiment, the fitting of the composite nacelle cover to the bed plate frame constitutes the sole external structural support for the composite nacelle cover.

Also disclosed herein is another aspect of the present invention as defined in the following clauses:

Clause 1: A composite nacelle cover (1;22) equipped with main machinery components (9a;9b;10) for a wind turbine, characterised in that the composite nacelle cover (1;22) has a composite wall (3,4,5,6,7) constituting a first load-carrying structure for at least one component of a first part (9a;9b) of the main machinery components.

Clause 2: A composite nacelle cover (1;22) according to clause 1, characterised in that a second part (10) of the main machinery components of the wind turbine is supported on a second load-carrying structure constituted by at least a part of a load-carrying frame (8;23).

Clause 3: A composite nacelle cover (1;22) according to clauses 1 or 2, characterised in that the composite nacelle cover (1;22) is a fiber-reinforced composite nacelle cover (1;22), preferably a fiber-reinforced composite nacelle cover (1;22) having opposite plastic face skins laminating a foam core.

Clause 4: A composite nacelle cover (1;22) according to clauses 2 or 3, characterised in that the second load-carrying structure is at least a part of a front frame (13;24) of the load-carrying frame, optionally the part of the load-carrying frame (8;23) that constitutes the second load-carrying structure is the entire front frame (13;24).

Clause 5: A composite nacelle cover (1;22) according to any of the preceding clauses 1-4, characterised in that the load-carrying frame (8;23) has no rear frame (15; 26), optionally no main frame (27).

Clause 6: A composite nacelle cover (1;22) according to any of the preceding claims 1-5, characterised in that in case a load-carrying frame (8;23) is provided in the composite nacelle cover (1;22) the length of the load-carrying frame (8;23) from a frame front end (14) to a frame rear end (16) is shorter than the length of the serially arranged main machinery components.

Clause 7: A composite nacelle cover (1;22) according to any of the preceding clauses 1-6, characterised in that the main machinery components of a wind turbine is selected from the group comprising one or more of main support, yaw system, brakes, cooling system, transformer, computer, electrical control cabinet(s), and the drive train including the low-speed shaft (main shaft), the gearbox, the high-speed shaft, shaft bearings, and the generator, in particular the first part of main machinery components secured to the first load-carrying structure is the transformer (9a) and/or electrical control cabinet(s) (9b).

Clause 8: A composite nacelle cover (1;22) of a wind turbine according to any of the preceding claim clauses 1-7, characterised in that the composite nacelle cover (1;22) has substantially flat and straight walls (3,4,5,6, 7).

Clause 9: A wind mill comprising a tower and a bed plate frame (25) at the top of the tower, characterised in that the wind mill comprises the composite nacelle cover (1;22) according to any of the preceding clauses 1-8 equipped with main machinery components secured to the wall of the composite nacelle cover (1;22) without using one or more of a part of a load-carrying frame (8;23).

Clause 10: A wind mill according to clause 9, characterised in that the composite nacelle cover (1;22) is mounted directly to the tower, optionally the gearbox is mounted directly to the front frame part (13;24).

Due to the conventional, traditional practice of using a metal load-carrying frame as an indispensable complete load-carrying structure for all main machinery components, the applicant attempts any prejudices against utilizing the wall of the composite nacelle cover by a gradual conversion to non-use of load-carrying frame for the main machinery components of a nacelle. Thus a gradual reduction of the length of the load-carrying frame is intended within the scope of the present invention, optionally until no load-carrying frame is no longer present.

The invention claimed is:

1. A wind turbine nacelle, the nacelle comprising a composite nacelle cover delimiting an interior space accommodating a plurality of main machinery components of the wind turbine, wherein the plurality of main machinery components are serially arranged in a length direction which extends from a nacelle front end to a nacelle rear end, the nacelle front end being closest to a rotor of the wind turbine and the nacelle rear end being farthest from the rotor, and the serially arranged plurality of main machinery components comprise a first part of the main machinery components and a second part of the main machinery components, wherein the nacelle further comprises a load-carrying frame having a frame front end and a frame rear end, wherein the length of the load-carrying frame from the frame front end to the frame rear end is shorter than the length of the serially arranged main machinery components along the length direction, wherein the second part of the main machinery components is supported on the load-carrying frame and the first part of the main machinery components is secured to a composite wall of the composite nacelle cover, the composite wall constituting a first load-carrying structure for the first part of the main machinery components, wherein the load-carrying frame comprises a bed plate frame having an upper side which supports a drive train which is connected to the rotor, and a lower side which is connected to a yaw bearing between the nacelle and a tower of the wind turbine, wherein the load-carrying frame further comprises a main frame which extends rearwardly from the bed plate frame, and wherein the main frame comprises the frame rear end which is located at a position, rearward of the nacelle front end, which is within a range of from 25 to 75% along the length of the nacelle cover from the nacelle front end.

2. A wind turbine nacelle according to claim 1, wherein the first part of the main machinery components is unsupported by the load-carrying frame.

3. A wind turbine nacelle according to claim 1, wherein the first part of the main machinery components is secured to the composite wall of the composite nacelle cover at a position which is rearward of the frame rear end.

4. A wind turbine nacelle according to claim 1, wherein the load-carrying frame consists of the bed plate frame.

5. A wind turbine nacelle according to claim 1, wherein the frame rear end is located at a position, rearward of the nacelle front end, which is about two thirds along the length of the nacelle cover from the nacelle front end.

6. A wind turbine nacelle according to claim 1, wherein the bed plate frame comprises a hole which is aligned with a bottom hole in the composite nacelle cover.

7. A wind turbine nacelle according to claim 1, wherein the first part of the main machinery components is located between the frame rear end and the nacelle rear end.

8. A wind turbine nacelle according to claim 1, wherein the composite nacelle cover is a fiber-reinforced composite nacelle cover having opposite plastic face skins laminating a foam core.

9. A wind turbine nacelle according to claim 1, wherein the first part of the main machinery components is secured directly to the composite wall of the composite nacelle cover by means of brackets and bolts.

10. A wind turbine nacelle according to claim 9, wherein the first part of the main machinery components is suspended from sidewalls of the composite nacelle cover.

11. A wind turbine nacelle according to claim 1, wherein the second part of the main machinery components comprises a drive train of the wind turbine.

12. A wind turbine nacelle according to claim 11, wherein the drive train of the wind turbine includes a main shaft connected to the rotor, shaft bearings, and a generator.

13. A wind turbine nacelle according to claim 12, wherein the drive train of the wind turbine further includes a gearbox between the main shaft, as a low speed shaft, and an output shaft, as a high speed shaft, connected to the generator.

14. A wind turbine nacelle according to claim 1, wherein the first part of the main machinery components secured to the first load-carrying structure comprises, or is, a transformer.

15. A wind turbine nacelle according to claim 14, wherein the first part of the main machinery components secured to the first load-carrying structure further comprises one or more electrical control cabinet(s).

16. A wind turbine comprising a tower and a wind turbine nacelle according to claim 1 at a top of the tower.

17. A wind turbine according to claim 16, wherein a bed plate frame connects the composite nacelle cover to the tower.

18. A wind turbine nacelle, the nacelle comprising a composite nacelle cover delimiting an interior space accommodating a plurality of main machinery components of the wind turbine, the plurality of main machinery components comprising a first part of the main machinery components and a second part of the main machinery components, the nacelle having a nacelle front end and a nacelle rear end which is spaced from the nacelle front end along a length direction of the nacelle, the nacelle front end being closest to a rotor of the wind turbine and the nacelle rear end being farthest from the rotor, wherein the nacelle further comprises a load-carrying frame, the load-carrying frame having a frame front end and a frame rear end, wherein the frame rear end is within the interior space and is spaced inwardly from the nacelle rear end along the length direction, wherein the first part of the main machinery components is secured to a composite wall of the composite nacelle cover at a position, along a length direction of the nacelle, which is rearward of the frame rear end and between the frame rear end and the nacelle rear end, the composite wall constituting a first load-carrying structure for the first part of the main machinery components, and the second part of the main machinery components is supported on the load-carrying frame constituting a second load-carrying structure for the second part of the main machinery components, wherein the load-carrying frame comprises a bed plate frame having an upper side which supports a drive train which is connected to the rotor, and a lower side which is connected to a yaw bearing between the nacelle and a tower of the wind turbine, and wherein the load-carrying frame further comprises a main frame which extends rearwardly from the bed plate frame, wherein the main frame comprises the frame rear end which is located at a position, rearward of the nacelle front end, which is within a range of from 25 to 75% along the length of the nacelle cover from the nacelle front end.

19. A wind turbine nacelle according to claim 18, wherein the load-carrying frame consists of the bed plate frame.

20. A wind turbine nacelle according to claim 18 wherein the composite nacelle cover is fitted to the bed plate frame, and bed plate frame connects the composite nacelle cover to the tower, wherein the bed plate frame constitutes a load-carrying structure for the composite nacelle cover and the first part of the main machinery components secured to the composite nacelle cover, and wherein the composite nacelle cover is self-supporting.

* * * * *